US008208732B2

(12) United States Patent  (10) Patent No.: US 8,208,732 B2
Nakamura  (45) Date of Patent: Jun. 26, 2012

(54) IMAGE PROCESSING APPARATUS, IMAGE CAPTURING APPARATUS, IMAGE PROCESSING METHOD AND RECORDING MEDIUM

(75) Inventor: Tomokazu Nakamura, Kurokawa-gun (JP)

(73) Assignee: FUJIFILM Corporation, Tokyo (JP)

( * ) Notice: Subject to any disclaimer, the term of this patent is extended or adjusted under 35 U.S.C. 154(b) by 948 days.

(21) Appl. No.: 12/234,669

(22) Filed: Sep. 21, 2008

(65) Prior Publication Data

US 2009/0087099 A1 Apr. 2, 2009

(30) Foreign Application Priority Data

Sep. 28, 2007 (JP) ................................. 2007-256711

(51) Int. Cl.
*G06K 9/46* (2006.01)
(52) U.S. Cl. .......................... 382/190; 382/118; 382/224
(58) Field of Classification Search .......................... None
See application file for complete search history.

(56) References Cited

U.S. PATENT DOCUMENTS

| 6,919,927 | B1 * | 7/2005 | Hyodo .................... 348/333.02 |
| 2003/0048358 | A1 * | 3/2003 | Shirai ........................ 348/207.1 |
| 2006/0115157 | A1 | 6/2006 | Mori et al. | |
| 2007/0109428 | A1 * | 5/2007 | Suzuki et al. ............ 348/231.99 |
| 2008/0220750 | A1 * | 9/2008 | Steinberg et al. .......... 455/414.1 |

FOREIGN PATENT DOCUMENTS

| EP | 1 650 711 A1 | 4/2006 |
| JP | 08-263623 A | 10/1996 |
| JP | 2000-259833 A | 9/2000 |
| JP | 2005-056387 A | 3/2005 |
| JP | 2005-056388 A | 3/2005 |
| JP | 2007-088644 A | 4/2007 |
| JP | 2008-113262 A | 5/2008 |
| JP | 2009-033491 A | 2/2009 |
| WO | WO 2005/008593 A1 | 1/2005 |

OTHER PUBLICATIONS

Ying-li Tian, Takeo Kanade, and Jeffrey F. Cohn, "Recognizing Action Units for Facial Expression Analysis", Feb. 2001, IEEE Transactions on Pattern Analysis and Machine Intelligence, vol. 23, No. 2, pp. 97-115.*
Explanation of circumstances concerning accelerated examination, submitted Oct. 1, 2010, in corresponding JP Application No. 2007-256711, 9 pages in English and Japanese.
Notice of Reasons for Rejection, dated Dec. 21, 2010, issued in corresponding JP Application No. 2007-256711, 4 pages in English and Japanese.

* cited by examiner

*Primary Examiner* — Jason M Repko
*Assistant Examiner* — Siamak Harandi
(74) *Attorney, Agent, or Firm* — Sughrue Mion, PLLC

(57) ABSTRACT

Frame images captured in a continuous manner are acquired, and temporarily stored. Characteristic points of faces in the acquired frame images are extracted. A sum (expression change amount) of distances between characteristic points of the face (face parts) in a current frame and the characteristic points of a preceding frame is calculated. The target frame image in which the expression change amount is largest, and m frame images preceding and following the target frame image in which the expression change amount is largest are extracted as best image candidates. A best shot image is extracted from the best image candidates and stored in a storage medium. Thus, only an image (best shot image) which contains a face which a user wishes to record can be efficiently extracted from among images captured in a continuous manner, and stored.

25 Claims, 13 Drawing Sheets

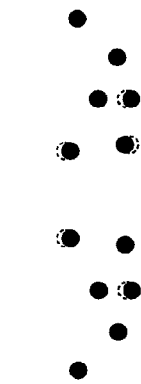
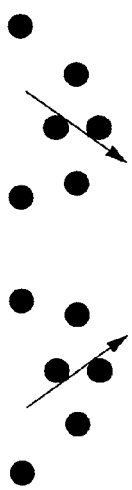
FIG.4C SMILING FACE TEMPLATE
FIG.4B CHARACTERISTIC POINTS OF TARGET FRAME AFTER NORMALIZATION
FIG.4A CHARACTERISTIC POINTS OF TARGET FRAME BEFORE NORMALIZATION
DIFFERENCE (SMILE-LIKENESS SCORE)
NORMALIZE (ENLARGE/REDUCE)

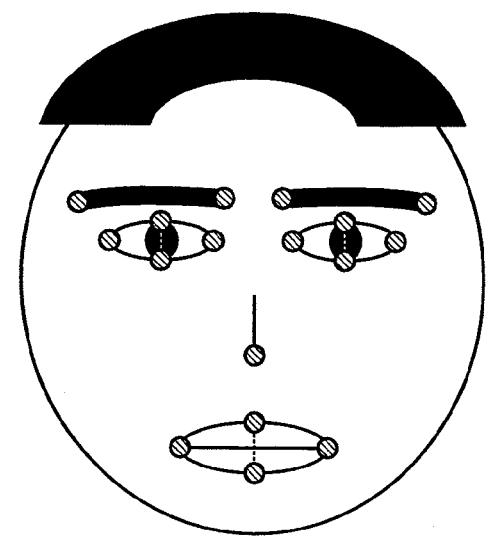
FIG.5A    ORDINARY FACE
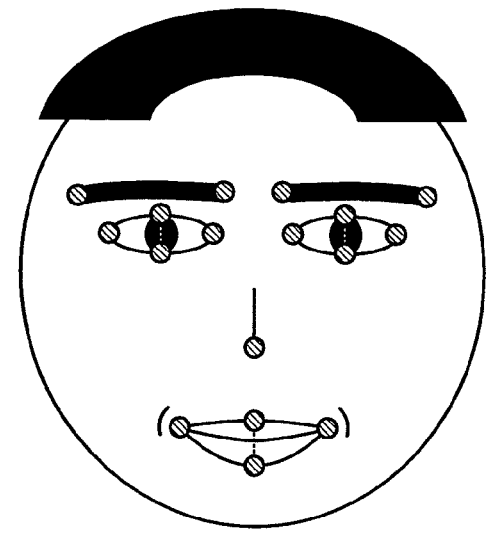
FIG.5B    SMILING FACE 1
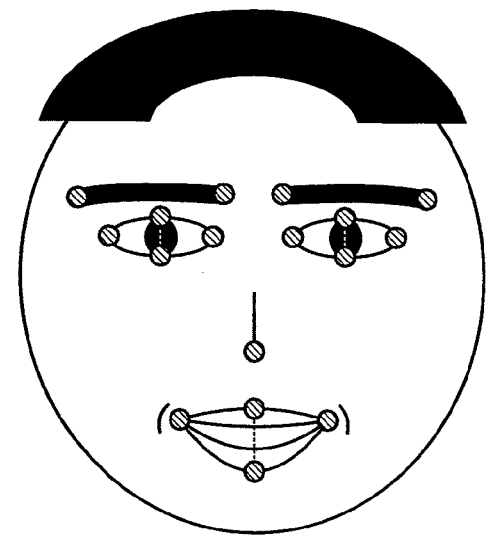
FIG.5C    SMILING FACE 2

IMAGE PROCESSING APPARATUS, IMAGE CAPTURING APPARATUS, IMAGE PROCESSING METHOD AND RECORDING MEDIUM

BACKGROUND OF THE INVENTION

1. Field of the Invention

The present inventions relates to an image processing apparatus, image capturing apparatus, image processing method and image processing program, and in particular to a technique for storing a best shot image.

2. Description of the Related Art

A face image processing method has been proposed in the prior art. The method includes continuously inputting a human image including a face image, judging a state of a subject's face (e.g. a state of the pupils) from the image, and automatically selecting an image including a suitable face image which matches the desires of the user (Japanese Patent Application Laid-Open No. 2000-259833). This method makes it possible to obtain, for example, an image which includes a suitable face image in which the subject has their eyes open by pointing the camera at the subject for a certain length of time.

An image processing apparatus has also been proposed in the prior art. The proposed image processing apparatus finds characteristic points in predetermined parts (corresponding to the eyes, mouth and nose) in a face contained in an inputted image, and finds characteristic amounts for the predetermined parts (e.g. the distance between an end point of an eye (characteristic point) and an end point of the mouth (characteristic point)). The image processing apparatus also finds characteristic amounts for the predetermined parts in another image containing a face of a predetermined facial expression. The image processing apparatus further calculates differences for each predetermined part between the characteristic amounts of the inputted image and the characteristic amounts of the other image, and calculates scores for each predetermined part based on the differences. By comparing a distribution of the scores calculated for the inputted image with known distributions of scores calculated for the predetermined parts in faces of various facial expressions, the image processing apparatus judges which facial expression is on the face in the inputted image (Japanese Patent Application Laid-Open No. 2005-56388).

Further, according to the image capturing apparatus of Japanese Patent Application Laid-Open No. 2005-56388, when a user wishes to capture an image including a desired facial expression (such as a smile), time-series images including the face are captured, and the distributions of scores calculated for each of the images with a distribution of calculated scores for predetermined parts in a smiling face are compared. By storing only the image having the distribution closest to the distribution for the smiling face, the image capture device is able to store an image including the desired expression.

SUMMARY OF THE INVENTION

However, the invention of Japanese Patent Application Laid-Open No. 2000-259833 has a problem in that, because it is judged whether every image of the continuously inputted images includes the suitable face image desired by the user (e.g. the image in which the subject's eyes are open), a large amount of image processing is required.

In addition, the invention of Japanese Patent Application Laid-Open No. 2005-56388 also has a similar problem in that, because the image processing apparatus judges the expression of the face in every image of the sequence of images, a large amount of image processing is required.

Further, the inventions of Japanese Patent Application Laid-Open No. 2000-259833 and 2005-56388 both have a further problem in that, if images containing a suitable face image or face image of the desired expression are inputted continuously, the inputted images (e.g. identical images containing a face with the same expression) are all stored, and memory capacity of the storage medium is needlessly consumed.

The present invention was conceived after considering the above-described problems and the objective is to provide an image processing apparatus, an image capturing apparatus, an image processing method and an image processing program capable of storing only the image which the user wishes to store (hereinafter referred to as the "best shot image") from the continuously captured images, and capable of efficiently extracting the best shot image.

To achieve the objective, an image processing apparatus according to a first aspect of the present invention includes: an image acquiring device which sequentially acquires images that are captured in a continuous manner; a face detecting device which detects a face in the acquired images; an expression change amount calculating device which calculates an expression change amount representing a change in expression between a face detected in an image of a current target frame and a face detected in an image of a previous target frame, for each of the target frames, the target frames being every acquired frame or frames at a regular interval in the acquired frames; an extracting device which extracts an image of a target frame for which the calculated expression change amount is greater than or equal to a predetermined value; and a storage device which stores in a storage medium the image of the extracted target frame or an image of a frame near the extracted target frame.

Thus, an image of the target frame having the face which has a large change in facial expression is extracted from among the images captured in a continuous manner, and the image of the extracted target frame or an image of a frame near the extracted target frame is stored in the storage medium.

Note that there is a high probability that a face which has a larger change in facial expression will be a desirable image (i.e. image (best shot) of a face which the user wishes to store). Further, less image processing load is required to calculate the expression change amount between two images than is required to analyze the facial expression itself. Moreover, when a face of unchanging expression captured in consecutive images, the images containing such a face are not stored. Thus, wasteful use of memory capacity on the storage medium is avoided.

An image processing apparatus according to a second aspect of the present invention includes: an image acquiring device which sequentially acquires images that are captured in a continuous manner; a face detecting device which detects a face in the acquired images; an expression change amount calculating device which calculates an expression change amount representing a changes in expression between the face detected in image of each target frame and a reference template face, for each of the target frames, the target frames being every acquired frame or frames at a regular interval in the acquired frames; an extracting device which extracts an image of a target frame for which the calculated expression change amount is greater than or equal to a predetermined value; and a storage device which stores in a storage medium the image of the extracted target frame or an image of a frame near the extracted target frame.

The invention according to the first aspect calculates an expression change amount between the face detected in a current target frame image and the face detected in a previous target frame image of the continuously captured images. On the other hand, the invention according to the second aspect differs from that of the first aspect in that the expression change amounts between images of target frames continuously captured and the reference template are calculated.

According to a third aspect of the present invention, in the image processing apparatus according to the second aspect, the reference template is created based on coordinate positions of a plurality of characteristic points corresponding to face parts of an ordinary face of one or more persons.

Note that a face in an image of any frames continuously captured for which expression change amounts between the face of preceding and following frames is no more than a predetermined value can be used as the ordinary face.

According to a fourth aspect of the present invention, in the image processing apparatus according to the third aspect, a plurality of the reference templates corresponding to human attributes are created in advance and stored in a memory, and a reference template corresponding to a human attribute in the images acquired by the image acquiring device is read from the memory and used. Examples of human attributes which may be considered include sex, age, maturity (child or adult) and race.

According to a fifth aspect of the present invention, the image processing apparatus according to any of the first to fourth aspects may further include a representative face selecting device which selects, when a plurality of faces are detected by the face detecting device, a representative face according to a condition on at least one of brightness, position, size, and clearness of a face, as a detected face in the image of the target frame. In other words, when there is more than one person in the captured images, a single person is selected as a target. With this arrangement, the best shot image can be stored for the person selected as the target, and the selection of the images to be stored is simplified.

According to a sixth aspect of the present invention, in the image processing apparatus according to any of the first to fifth aspects, the expression change amount detecting device includes: a characteristic point extracting device which extracts a plurality of characteristic points corresponding to each of the face parts; a normalizing device which normalizes coordinate positions of the extracted characteristic points; and a calculating device which calculates, for two compared faces, the expression change amount based on a sum of distances between the normalized coordinate positions of corresponding characteristic points in each face, or a sum of squares of the distances therebetween. This arrangement allows the expression change amount to be calculated with a simple operation.

According to a seventh aspect of the present invention, the image processing apparatus according to any of the first to sixth aspects may further include: a best image candidate extracting device which extracts, as best image candidates, the image of the extracted target frame and images of a plurality of consecutive frames which are at least one of preceding and following the image of the target frame; and a best image selecting device which selects a best image from the extracted group of best image candidates, wherein the storage device stores the selected best image in the storage medium.

According to an eighth aspect of the present invention, in the image processing apparatus according to the seventh aspect, the best image selecting device includes: at least one of: a first evaluating device which compares the faces of the best image candidates with an expression template representing a predetermined expression and awards a score to each best image candidate based on results of the comparison; a second evaluation device which detects a face direction in the best image candidates and awards a score to each best image candidate based on the detected face direction; and a third evaluating device which detects a direction of a subject's eyes in the best image candidates and awards a score to each best image candidate based on the detected direction of the subject's eyes; and a selecting device which selects the best image from among the best image candidates based on the one or more scores awarded by the at least one of the evaluation devices.

The first evaluating device may award, for instance, higher scores as the degree of matching increases between the characteristic points of the face parts of the best image candidate and the expression template representing the predetermined expression. Note that the degree of matching can be obtained by calculating the average or sum of the distances between the respective sets of characteristic points. Further, the expression template may be any of a plurality of templates which includes the smiling face template.

The second evaluation device awards higher scores as the face of the best image candidate is closer to a frontal face (that is, as the direction of the face moves towards being forward-facing). The third evaluation device awards higher scores as the subject's eyes of the best image candidate are casted on the image capturing device more straightforward (that is, as the direction of the subject's eyes of the best image candidate moves towards the image capturing device). The selecting device then selects the best image from among the best image candidates based on at least one of the three scores (including a sum of two or more scores may be used) awarded by the first to third evaluating devices.

According to a ninth aspect of the present invention, in the image processing apparatus according to the eighth aspect, the selecting device selects the image having a highest score as the best image, or selects, from among best image candidates whose score is greater than or equal to a predetermined value, an image having a largest expression change amount calculated by the expression change amount calculating device as the best image.

An image capturing apparatus according to a tenth aspect of the present invention includes: an image capturing device operable to capture images of a subject in a continuous manner; and the image processing apparatus according to any of the first to ninth aspects, wherein the image acquiring device sequentially acquires the images captured in a continuous manner by the image capturing device.

With this arrangement, while capturing the subject in a continuous manner, the device may store the images in which changes in facial expression are larger as the image candidates in the storage medium.

According to an eleventh aspect of the present invention, the image capturing apparatus according to the tenth aspect may further include: an image capture instructing device; and a stored number setting device which sets a number of images to be stored in the storage medium in response to a single image capture instruction by the image capture instructing device, wherein when the instruction for image capture is issued by the image capture instructing device, an image capturing operation by the image capturing device and image processing by the image processing apparatus are repeated until a number of stored images reaches the set number of images to be stored.

For instance, when a single instruction for image capture is inputted from an image capture instructing device such as a shutter button or the like, images including the faces with larger change in expression are sequentially stored until the preset number of images to be stored is reached.

According to a twelfth aspect of the present invention, the image capturing apparatus according to the eleventh aspect may further include a capture termination instructing device, wherein when, after the image capture instructing device has issued the instruction for image capture, an instruction for capture termination is issued by the capture termination instructing device, the image capturing operation by the image capturing device and image processing by the image processing apparatus are terminated before the number of the stored images reaches the set number of images to be stored.

Thus, even if a number of images to be stored at a time in response to the instruction for image capture has been preset, the user can terminate the image capturing operations by an operation on the capture termination instructing device after capturing a desired facial expression (best shot images).

According to a thirteenth aspect of the present invention, the image capturing apparatus according to the tenth aspect may further include an image capture instructing device, wherein when the instruction for image capture is issued by the image capture instructing device, an image capturing operation by the image capturing device and image processing by the image processing apparatus are repeated until no space remains in the storage medium.

According to a fourteenth aspect of the present invention, the image capturing apparatus according to the thirteenth aspect may further include a capture termination instructing device, wherein when, after the image capture instructing device has issued the instruction for image capture, an instruction for capture termination is issued by the capture termination instructing device, the image capturing operation by the image capturing device and image processing by the image processing apparatus are terminated before no space remains in the storage medium.

In the image capturing apparatus of the twelfth and fourteenth aspects, the capture termination instructing device may make use of the same operations device (i.e. the shutter button) as the image capture instructing device. For instance, pressing the shutter button once may instruct image capture to begin and pressing the shutter button a second time may instruct image capture to terminate.

According to a fifteenth aspect of the present invention, the image capturing apparatus according to any of the tenth to fourteenth aspects, may further include a sound generating device which generates a sound every time an image is stored in the storage medium to alert a user of a storage timing. With this arrangement, the user can check the timing at which an image is stored, and know what type of expression is on the face in the stored image.

According to a sixteenth aspect of the present invention, the image capturing apparatus according to any of the tenth to fifteenth aspects may further include: an image displaying device which displays images captured in a continuous manner by the image capturing device; and a display controlling device which causes the image displaying device to display one or more images most recently stored on the storage medium as reduced-size images having an area smaller than a whole display area of the image displaying device. With this arrangement, the user can check the stored images and produce pictures based on an assessment of the variation in the expressions and composition of the stored images.

According to a seventeenth aspect of the present invention, the image capturing apparatus of any of the tenth to sixteenth aspects may further include: a displaying device which displays a maximum number of images storable on the storage medium and a current number of stored images, the current number of stored images being updated every time an image is stored in the storage medium. With this arrangement, the user is able to perform image capture, considering the number of images which can still be recorded in the storage medium.

According to an eighteenth aspect of the present invention, the image capturing apparatus according to any of the tenth to seventeenth aspects may further include a displaying device which displays the current number of stored images that is updated every time an image is stored in the storage medium and changes a display form of the current number of stored images at least when the number of image stored on the storage medium approaches a maximum number of images storable in the storage medium. With this arrangement, the user is able to perform image capture, considering the number of images which can still be stored in the storage medium. Note that the form of the indicator for the current number of stored images can be altered by changing the color of the indicator for the current number of stored images, by causing the indicator for the current number of stored images to flash, or by some other method.

An image processing method according to a nineteenth aspect of the present invention includes steps of: sequentially acquiring images captured in a continuous manner; detecting a face in the acquired images; calculating an expression change amount representing a change in expression between a face detected in an image of a current target frame and a face detected in an image of a previous target frame, for each of the target frames, the target frames being every acquired frame or frames at a regular interval in the acquired frames; extracting an image of a target frame for which the calculated expression change amount is greater than or equal to a predetermined value; and storing in a storage medium the image of the extracted target frame or an image of a frame near the extracted target frame.

An image processing method according to a twentieth aspect of the present invention includes steps of: sequentially acquiring images captured in a continuous manner; detecting a face in the acquired images; calculating an expression change amount representing a changes in expression between the face detected in image of each target frame and a reference template face, for each of the target frames, the target frames being every acquired frame or frames at a regular interval in the acquired frames; extracting an image of a target frame for which the calculated expression change amount is greater than or equal to a predetermined value; and storing in a storage medium in a storage medium the image of the extracted target frame or an image of a frame near the extracted target frame.

According to a twenty-first aspect of the present invention, the image processing method according to the nineteenth or twentieth aspect, may further include steps of: extracting, as best image candidates, the image of the extracted target frame and images of a plurality of consecutive frames which are at least one of preceding and following the image of the target frame; and selecting a best image to be stored in the storage medium from the extracted group of best image candidates.

According to a twenty-second aspect of the present invention, a recording medium on which an image processing program is stored is provided. The image processing program on the recording medium according to the twenty-second aspect, causes a computer to realize functions of: sequentially acquiring images captured in a continuous manner; detecting a face in the acquired images; calculating an expression change amount representing a change in expression between a face detected in an image of a current target frame and a face detected in an image of a previous target frame, for each of the target frames, the target frames being every acquired frame or frames at a regular interval in the acquired frames; extracting an image of a target frame for which the calculated expression change amount is greater than or equal to a predetermined value; and storing in a storage medium the image of the extracted target frame or an image of a frame near the extracted target frame.

According to a twenty-third aspect of the present invention, a recording medium on which an image processing program is stored is provided. The image processing program on the recording medium according to the twenty-third aspect, causes a computer to realize functions of: sequentially acquiring images captured in a continuous manner; detecting a face in the acquired images; calculating an expression change amount representing a changes in expression between the face detected in image of each target frame and a reference template face, for each of the target frames, the target frames being every acquired frame or frames at a regular interval in the acquired frames; extracting an image of a target frame for which the calculated expression change amount is greater than or equal to a predetermined value; and storing in a storage medium in a storage medium the image of the extracted target frame or an image of a frame near the extracted target frame.

According to a twenty-fourth aspect of the present invention, the image processing program recorded on the recording medium according to the twenty-second or twenty-third aspect, may further cause a computer to realize functions of: extracting, as best image candidates, the image of the extracted target frame and images of a plurality of consecutive frames which are at least one of preceding and following the image of the target frame; and selecting a best image to be stored in the storage medium from the extracted group of best image candidates.

According to the aspects of the present invention, an image of a target frame having larger change in facial expression is extracted from images captured in a continuous manner, and the image of the extracted target frame or an image of a frame near the extracted target frame is stored on the storage medium. Hence, the user can store the image (best shot image), among the continuously captured images, of a face they wish to record. Moreover, the best shot images can be extracted efficiently.

BRIEF DESCRIPTION OF THE DRAWINGS

FIGS. 4A, 4B and 4C are diagrams for describing normalization of face characteristic points of a target frame and a smiling face template;

FIGS. 5A, 5B and 5C are diagrams showing the characteristic points of an ordinary face and the characteristic points of smiling faces 1 and 2;

DETAILED DESCRIPTION OF THE PREFERRED EMBODIMENTS

The following describes preferred embodiments of the image processing apparatus, the image capturing apparatus, the image processing method and the image processing program according to the present invention with reference to the accompanying drawings.

[Configuration of the Image Capturing Apparatus]

Figure 1:
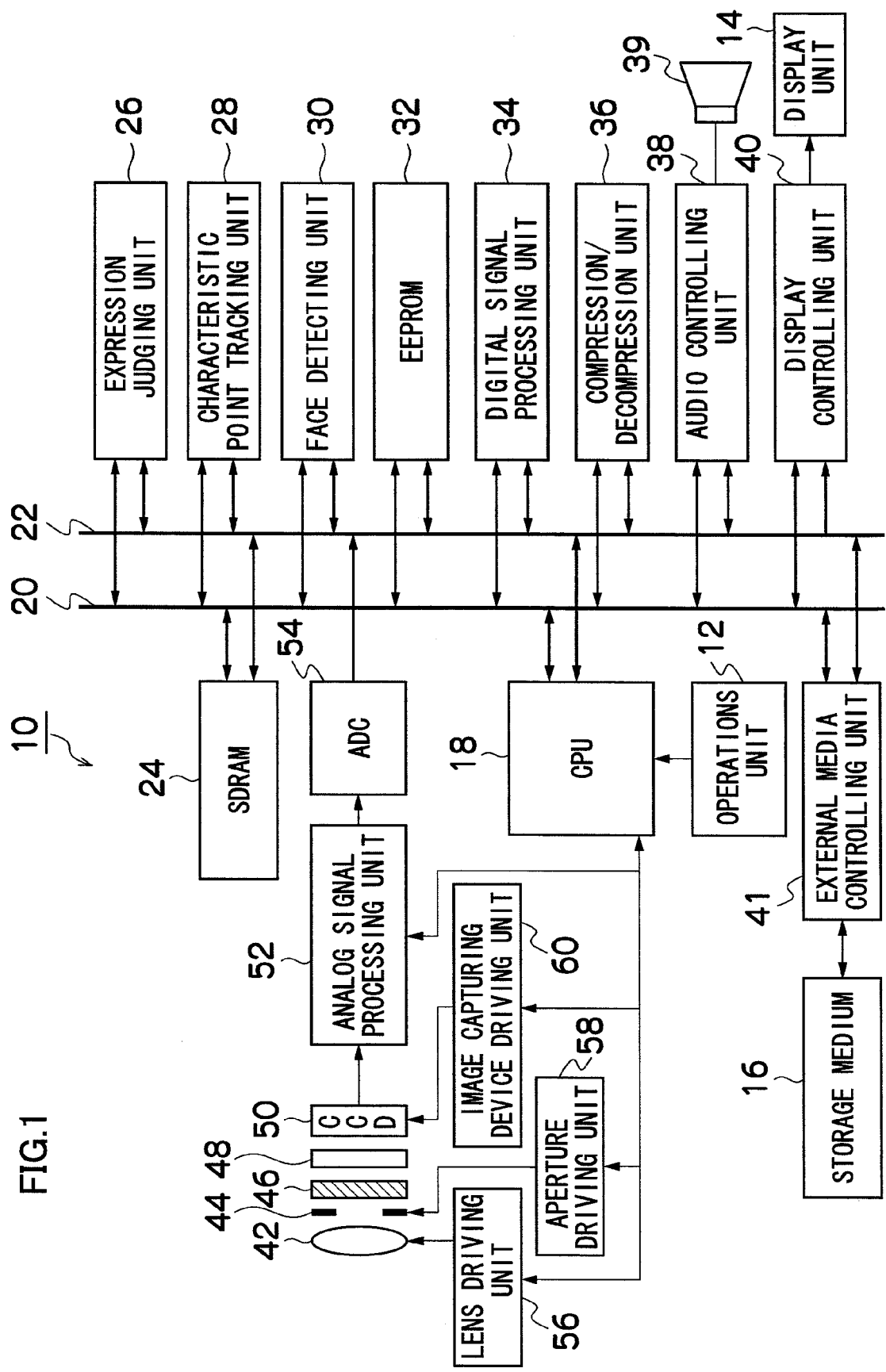
FIG. 1 is a block diagram showing an embodiment of an image capturing apparatus (digital camera) according to the present invention.

FIG. 1 is a block diagram showing an embodiment of an image capturing apparatus (digital camera) 10 according to the present invention.

The digital camera 10 has functions for storing still images and moving images and playing back these images. An operations unit 12 includes a power button, a shutter button, a mode lever, a zoom key, a playback button, a multifunction cross-key made up of up, down, left and right keys, a menu/OK button, a display/return button and the like.

By turning the mode lever it is possible to select any of a number of scenario positions including an automatic image capture mode, a manual image capture mode, a person image capture mode, a view image capture mode and a night scene image capture mode. It is also possible to select a moving image mode or the best shot image capture mode of the present invention. The shutter button includes a switch S1 which is switched on when the shutter button is half-pressed and causes the digital camera 10 to prepare for image capture through use of automatic exposure adjustment (AE) and automatic focus adjustment (AF), and a switch S2 which is switched on when the shutter button is fully pressed and causes the digital camera 10 to capture an image.

A display unit (liquid crystal monitor) 14 displays a moving image (pass-through image) and may therefore be used as an electronic viewfinder. The display unit 14 can also display captured images prior to storing (preview images) and images and the like read from a storage medium 16, such as a memory card, loaded into the camera. The display unit 14 also displays, in response to operations on the menu/OK button, various types of menu screen used when manually setting the operations mode of the camera, a white balance, a number of pixels in the images, and sensitivity. The display unit 14 further displays a graphical user interface (GUI) from which it is possible to set the manual settings via operations on the cross-key and the menu/OK button.

When an operations signal is inputted from the operations unit 12, a central processing unit (CPU) 18 performs integrated control of the units in the digital camera 10 by executing processing in accordance with camera control programs. The CPU 18 is connected to a control bus 20 and a data bus 22.

Besides the CPU 18, the control bus 20 and the data bus 22 are also connected to SDRAM (synchronous dynamic RAM) 24, an expression judging unit 26, a characteristic point tracking unit 28, a face detecting unit 30, EEPROM 32, a digital signal processing unit 34, a compression/decompression unit 36, an audio controlling unit 38, a display controlling unit 40, and an external media controlling unit 41. Further and A/D converting circuit 54 is connected to the data bus 22.

The CPU 18 receives required data from the SDRAM 24 and the EEPROM 32. The EEPROM 32 has stored therein various parameters relating to camera control, such as a camera controlling program and fault information for the solid-state imaging device. The EEPROM further contains the image processing program according to the present invention, a reference template, expression templates, and the like.

The CPU 18 deploys the camera controlling program stored in EEPROM 32 into SDRAM 24, and executes various processing with the SDRAM 24 as work memory.

In the digital camera 10, when the power button of the operations unit 12 is switched to ON, the CPU 18 detects the switching, switches on the internal power, and puts the digital camera 10 in an image capture standby state of the image capture mode. In the image capture standby state, the CPU 18 always displays a moving image (pass-pass-through image) on the display unit 14.

The user (photographer) frames and checks the subject to be shot while viewing the pass-through image displayed on the display unit 14. The user also views captured images and sets the image capture conditions.

When the shutter button is half-pressed with the camera in the image capture standby state of the normal still image capture mode, the CPU 18 detects the half-press and performs AE light measurements and AF control. During AE measurement, the digital camera 10 measures a brightness of the subject based on a sum of the image signal acquired via the solid-state image capturing device (CCD) 50 or similar value. The value acquired by light measurement (measured light value) is used to determine an aperture value of an aperture 44 and a shutter speed for image capture. When capturing images, the CPU 18 drives the aperture 44 via an aperture driving unit 58 based on the aperture value determined from the measured light value and controls an electrical charge storing period (a so-called "electronic shutter") on the CCD 50 via an image capturing device driving unit 60 to provide the shutter speed determined using the measured light value.

When AF control is used, the CPU 18 also performs contrast AF by moving the focusing lens position little by little between close range and infinity, summing the frequency components of the image signal acquired in an AF area via the CCD 50 for each lens position to acquire an evaluation value, finding a lens position at which the evaluation value peaks, and moving the focusing lens to the lens position. Note that in moving image mode, the CPU 18 performs continuous AF using so-called "peak tracking control" in which the position of the focusing lens is controlled so that the peak evaluation value is maintained.

Light from the subject in incident on a light-receiving surface of the CCD 50 after passing through the imaging lenses 42, which include the focusing lens and a zoom lens, and then through the aperture 44, an infra-red cutting filter 46, and an optical low-pass filter 48.

The CCD 50 is constructed using a color CCD provided with an array of R, G and B color filters of a predetermined arrangement (such a Beyer or honeycomb arrangement). The light incident on the light-receiving surface of the CCD 50 is converted to a signal charge of an amount dependent on the amount of incident light by photodiodes in the light-receiving surface. The signal charges stored in the photodiodes are read in accordance with a timing signal applied by the image capturing device driving unit 60, and sequentially outputted from the CCD 50 as a voltage signal (image signal).

An analog signal processing unit 52 includes a CDS (correlated double sampling) circuit and an analog amplifier. The CDS circuit performs correlated double sampling on the CCD output signal based on a CDS pulse. The analog amplifier amplifies the image signal outputted from the CDS circuit according to an image capture sensitivity gain applied by the CPU 18. The A/D converting circuit 54 converts the analog image signal outputted from the analog signal processing unit 52 to a digital image signal. The resulting image signal (R, G and B RAW data) is transmitted to the SDRAM 24 via the data bus 22, and temporarily stored therein.

The face detecting unit 30 detects a human face in the pass-through image or moving image and outputs information about the position and size of the face to the CPU 18. More specifically, the face detecting unit 30 includes an image comparing circuit and face image templates (face dictionary). The image comparing circuit positions a target area on the screen showing the pass-through image or the like, and compares the image in the target area with the face dictionary to look for correlation. When a correlation score exceeds a predetermined threshold value, the image comparing circuit designates the target area as a face area. The face detecting unit 30 also detects face parts (such as the eyes, nose, mouth and eyebrows) by comparing the face parts in the face area with a face part dictionary.

On acquiring a position and size of the face area from the face detecting unit 30, the CPU 18 can cause the display unit 14 to display, superimposed on the pass-through image, a face detection frame surrounding the acquired face of the human subject.

The position and size of the face area detected in the above-described manner may also be used as the AF area to allow the camera to focus on the subject's face or as an AE area so that the brightness of the subject's face is suitable.

The expression judging unit 26 and the characteristic point tracking unit 28 operate when capturing images in the best shot image capture mode according to the present invention. The best shot image capture mode is a mode in which frame images are captured continuously in the manner of a moving image or sequential picture, the frame image judged to be the best shot image is extracted and stored on the storage medium 16.

The characteristic point tracking unit 28 detects characteristic points of the face image in each of the continuously captured frame images, and detects characteristic points in the face parts detected by the face detecting unit 30.

Figure 2:
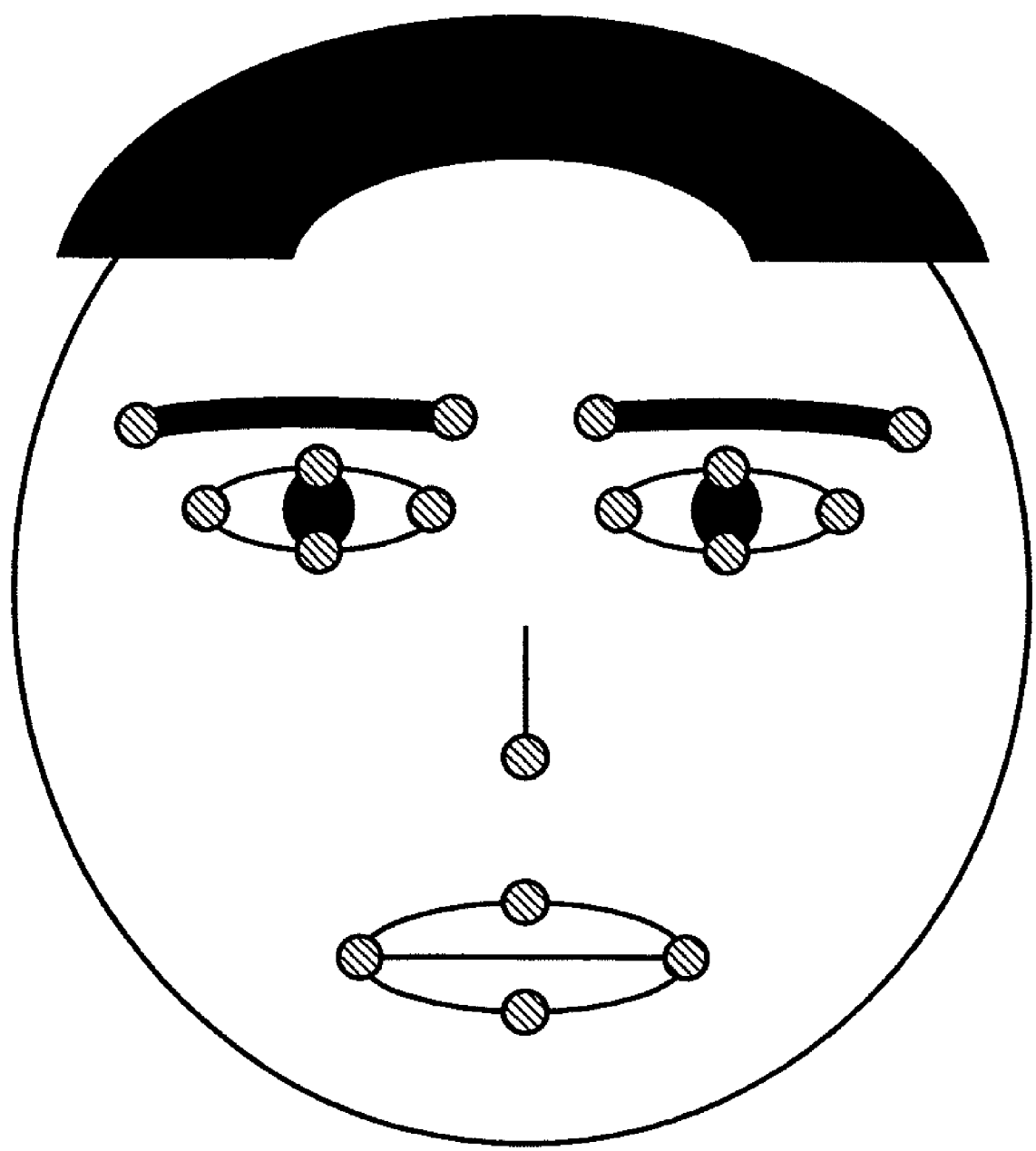
FIG. 2 is a diagram showing an example of face characteristic points which are associated with positions of face parts.

As shown in FIG. 2, in the present embodiment, the characteristic point tracking unit detects a total of 17 characteristic points, $P_i(x_i, y_i)$ (i=1 to 17) made up of 4 points on the eyebrows, 8 points on the eyes, 1 point on the tip of the nose, and 4 points on the mouth. The characteristic point tracking unit 28 tracks each of the characteristic points $P_i(x_i, y_i)$ in each frame image of the sequence.

The expression judging unit 26 calculates an expression change amount which represents the change in the detected facial expression in preceding and current frame images targeted for comparison, and judges the facial expression in order to select the best image.

To find the expression change amount, the characteristic points of a current frame which do not strongly depend on facial expression (e.g. the external edges of the eyes and the tip of the nose) are aligned (matched) with the corresponding characteristic points of the preceding frame (position adjustment). Or, the position adjustment may be performed by tracking the characteristic points between frames using a corresponding point detection technique such as the KLT algorithm (characteristic point tracking algorithm by Kanade-Lucas-Tomasi). The expression change amount is then calculated as the sum of the differences (distances) between corresponding characteristic points using the following formula.

$$\text{Expression change amount} = \Sigma \sqrt{(x_i - x_{i-1})^2 + (y_i - y_{i-1})^2} \quad \text{[Formula 1]}$$

Note that, though the expression change amount described in Formula 1 is found by summing the distances between the corresponding characteristic points, the sum of squares of the distances between the corresponding characteristic points may be used.

When the expression change amount calculated in the manner described above is greater than or equal to a predetermined threshold value, the expression judging unit 26 acquires m frame images from before and after the target frame as best image candidates. The expression judging unit 26 then computes, for instance, a smile-likeness score of each frame image in this group of images and extracts, from the group, a frame image whose smile-likeness score is the highest as the best image (best shot image). Details about the selection of the best shot image are described later.

The digital signal processing unit 34 functions an image processing device that includes a white balance adjusting circuit, a gamma correction circuit, a synchronizing circuit, a chrominance/luminance data generating circuit, an edge correcting circuit, an image converting circuit for inserting images, and a superimposition processing circuit. The digital signal processing unit 34 performs processing in accordance with commands from the CPU 18, making use of the SDRAM 24. Specifically, the R, G and B image signals read from the SDRAM 24 undergo white balance adjustment through application of a digital gain to the each of the R, G and B image signals by the white balance adjusting circuit, undergo gradation conversion processing by the gamma correcting circuit according to the gamma characteristics, and undergo synchronization by the synchronizing circuit. In the synchronization, time lags in the color signals associated with the arrangement of the color filters on a single CCD are corrected to provide color signals in a synchronous format. The synchronized R, G and B image signals are then converted to a luminance signal Y and chrominance signals Cr and Cb (i.e. a YC signal) by the chrominance/luminance data generating circuit. The Y signal undergoes edge enhancement processing by the edge correcting circuit. The digital signal processing unit 34 returns the YC signal resulting from the processing by the digital signal processing unit 34 to the SDRAM 24.

After being processed by the digital signal processing unit 34 and stored in the SDRAM 24, the YC signal is compressed by the compression/decompression unit 36, and stored in the storage medium 16 via the external media controlling unit 41 as an image file of a predetermined format (such as the JPEG (Joint Photographic Experts Group) format). The storage medium 16 may be a semiconductor memory card such as a removable xD-Picture Card (trademark) or SmartMedia (trademark), a portable compact hard disc, a magnetic disc, an optical disc, an optomagnetic disc or the like.

When the playback button of the operations unit 12 is operated to select the playback mode, the last frame of the image file stored in the storage medium 16 is read via the external media controlling unit 41. The compressed data of the read image file is decompressed to form a non-compressed YC signal via the compression/decompression unit 36.

The decompressed YC signal is stored in the SDRAM 24 (or in VRAM not shown in the drawings), converted to a signal format for display by the display controlling unit 40, and outputted to the display unit 14. Thus, the display unit 14 displays the last frame of the image file stored on the storage medium 16.

Thereafter, the user presses a frame forward order navigation switch (a right portion of the cross-key) to move through the frames in forward order and presses a frame reverse order navigation switch (a left portion of the cross-key) to move through the frames in reverse order. The image file is read from the storage medium 16 at the frame position determined by the frame navigation and the corresponding image is played back on the display unit 14 in the manner described above.

As well as causing the speaker 39 to generate sounds for the various operations of the camera and sound when playing back moving images, the audio controlling unit 38 causes the speaker 39 to generate a sound (an ear-catching sound such as the click of a shutter) to indicate the timing at which each best shot image is stored.

First Embodiment

The following describes a first embodiment for capturing/storing n best shot images, where the number of best shot images "n" to be stored in response to a single image capture instruction is set in advance.

Figure 3:
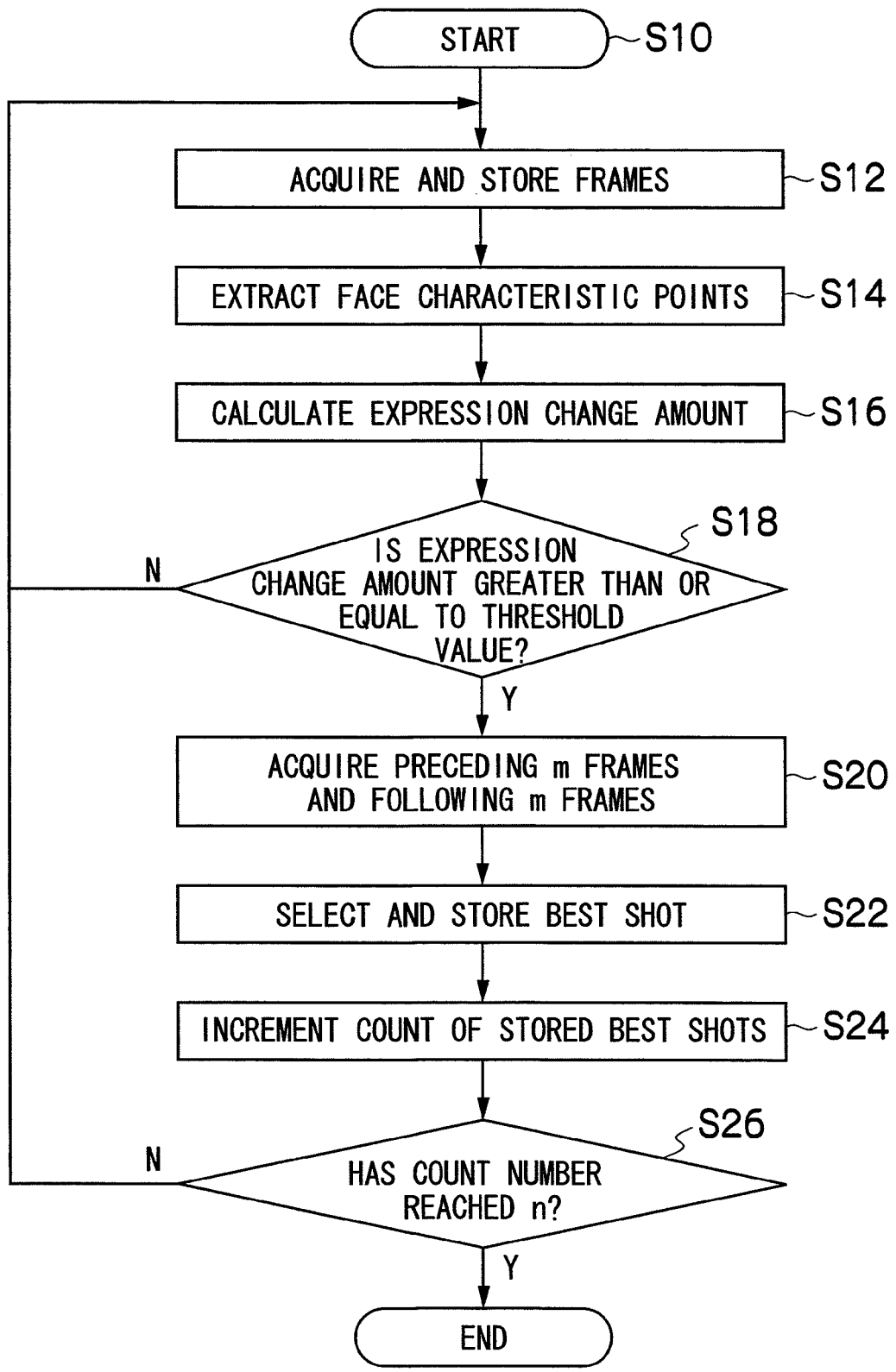
FIG. 3 is a flowchart showing an overall flow of processing of a first embodiment according to the present invention.

FIG. 3 is a flowchart showing an overall flow of processing of the first embodiment according to the present invention.

When the best shot image capture mode has been selected as the image capture mode and the shutter button is pressed down, image capture begins (step S10). Note that the number "n" of best shot images to be stored in response to a single image capture instruction may be determined from a default number or be set to an appropriate number (which may be 1) by the user. Also, when capturing images in the best shot image capture mode, frame images are captured in a continuous manner in the same way as for moving images and sequential picture.

The processing temporarily stores captured frame images in the SDRAM 24 (step S12). Next, the processing extracts the characteristic points from the face of the subject in target frame images among the frame images temporarily stored in the characteristic point tracking unit 28 (step S14). The target frames may include every frame of the continuously captured frame images or be selected frames at an interval of several frames. Note that selecting target frames at an interval of several frames makes it easier to find changes in expression and allows the processing load to be reduced.

The processing then extracts the 17 characteristic points $P_i(x_i, y_i)$ corresponding to the various positions of face parts as described with reference to FIG. 2.

Next, the expression judging unit 26 calculates the expression change amount by substituting into the above-described Formula 1 the facial characteristic points $P_i(x_i, y_i)$ extracted from a current target frame image and the facial characteristic points $P_{i-1}(x_{i-1}, y_{i-1})$ extracted from a preceding target frame image stored in the SDRAM 24 (step S16).

The expression judging unit 26 then judges whether the calculated expression change amount is greater than or equal to a predetermined threshold value (step S18). When the expression judging unit 26 judges in the negative, the processing returns to step S12. When judging in the affirmative, the expression on the face of the subject is considered to have undergone a large change, and the processing proceeds to step S20.

In step S20, the processing extracts, as best image candidates, an image group including the current target frame for which the expression change amount has been judged to equal or exceed the threshold value and m frames preceding and following the current target frame.

Next, the processing selects a single best image (best shot image) from the 2m+1 frames of the image group (best image candidates) extracted in step S20 (step S22).

The following may be considered as possible methods for selecting the best shot image.

(1) The processing compares the faces of the best image candidates to a template of a predetermined expression, for example, smiling face template for a smile, and awards smile-likeness scores to the best image candidates depending on the results of the comparison.

[Calculation of Smile-Likeness Score]

First, the processing performs normalization processing on the characteristic points of the face of the target frame whose score is to be evaluated and the smiling face template. Using the tip of the nose as a reference point, the processing calculates the distance ($D1_i$, $D2_i$) to the respective reference points for each of the characteristic points of the 17 characteristic points included in each of the smiling face template and the target frame face, as shown in FIGS. 4A, 4B and 4C. The processing calculates the ratio of distances to the reference point ($D1_i/D2_i$) for each characteristic point, and calculates an average of the ratios over all the characteristic points. The processing then performs normalization processing (i.e. scaling to fit the smiling face template) on the coordinates of the characteristic points of the face of the target frame (see FIGS. 4A and 4B) by scaling the characteristic points of the face in the target frame using the average ratio.

The processing then calculates an average difference of distances between the characteristic points of the normalized target frame and the corresponding characteristic points of the smiling face template, and awards a smile-likeness score (see FIGS. 4B and 4C). Note that the smaller average difference a target frame has, the larger smile-likeness score is awarded to the frame.

The processing gives all the best image candidates a smile-likeness score in this way, and selects the best image candidate with the highest smile-likeness score as the best shot image.

(2) The processing compares the face of best image candidates with the smiling face template and awards a smile-likeness score to each best image candidate based on the result of the comparison. The processing then selects as a best shot image the image in which the expression change amount is greatest among the best image candidates whose smile-likeness score is greater than or equal to a predetermined value (default value).

As shown in FIG. 3, when the processing of step S22 selects the best shot image, the selected best shot image is stored in the storage medium 16.

Next, the processing counts the stored best shot images (step S24), and judges whether the number of stored best shot images has reached n (step S26). When the number has not reached n, the processing returns to step S12. When the number has reached n, the processing ends the capture of best shot images.

Note that the SDRAM 24 is required to temporarily store at least the m frames preceding and following the current target frame for which the expression change amount is calculated.

When the expression change amount is calculated in step S16, the characteristic points $P_i(x_i, y_i)$ and $P_{i-1}(x_{i-1}, y_{i-1})$ of the preceding and following frames are preferably normalized in the manner described above. The normalization makes it possible to calculate an expression change amount independent from factors such as face size.

Note also that the smile-likeness score is not limited being calculated in the manner described above, and may instead be calculated using differences in a characteristic amount between an ordinary face.

The characteristic amount can be expressed using positions of the characteristic points, distances between characteristic points or the presence/absence of lines (wrinkles) in the face.

FIG. 5A shows characteristic points of an ordinary face. FIGS. 5B and 5C show the characteristic points of smiling faces 1 and 2, respectively.

Smiling Face 1

As shown in FIG. 5B, both ends of the lips are raised in comparison to the ordinary face shown in 5A, and lines (wrinkles) have appeared at the nose and lips to give a face which has more of a smile than the ordinary face. If, for instance, "both ends of the lips are raised" and "lines have appeared or deepened in the face" are each awarded 1 point, the smile-likeness score awarded to Smiling Face 1 is 2 points.

Smiling Face 2

In the Smiling Face 2 shown in FIG. 5C the vertical width of the mouth is further larger than that of the Smiling face 1, compared to the ordinary face shown in FIG. 5A as result of the mouth opening. Meanwhile, the vertical width of the eyes is further smaller due to the rise in the cheeks. If "mouth open" and "eyes narrowed" are each given a point, the smile-likeness score awarded to Smiling Face 2 is 4 points.

By awarding weighted points for each characteristic amount using a weight indicating degree of importance, rather than awarding points with a uniform weight, the reliability of the scoring system is increased.

Modifications to the First Embodiment

In the above-described first embodiment, the image capture and storing is repeated until the preset number of best shot images "n" has been stored. However, the present invention is not limited to this arrangement may be repeated. When instructed to capture images, image capture and storing may be repeated until the remaining capacity of the storage medium 16 is exhausted.

Further, by providing a capture termination instructing device, it is possible to allow the user to end the image capture operation at a time of their choice.

For instance, using an operation on the capture termination instructing device, the user can end the image capture and other operations when a face of a desired expression (best shot image) has been captured but before the set number of recorded best shots "n" is reached or before the remaining capacity of the storage medium 16 is exhausted. Note that the capture termination instructing device may make use of the same operation device as the image capture instructing device (i.e. the shutter button). In this case, pressing the shutter button once may instruct that image capture is to be performed and pressing the button a second tine while capturing images may instruct that image capture is to be ended.

In the above-described first embodiment, the m frames preceding and the m frames following the target frame in which a expression change amount greater than or equal to the predetermined value were extracted as best image candidates. However, the present invention is not limited to such an arrangement, and it is acceptable to include only the m frames preceding the target frame or only the m frame following the target frame with the target frame image as the best image candidates.

Further, in the first embodiment, a smile-likeness score was calculated for each best image candidate when selecting the best shot image from the best image candidates. However, the best shot image may be selected without calculating the smile-likeness score by selecting the best image candidate having the largest expression change amount as the best shot image.

Second Embodiment

Figure 6:
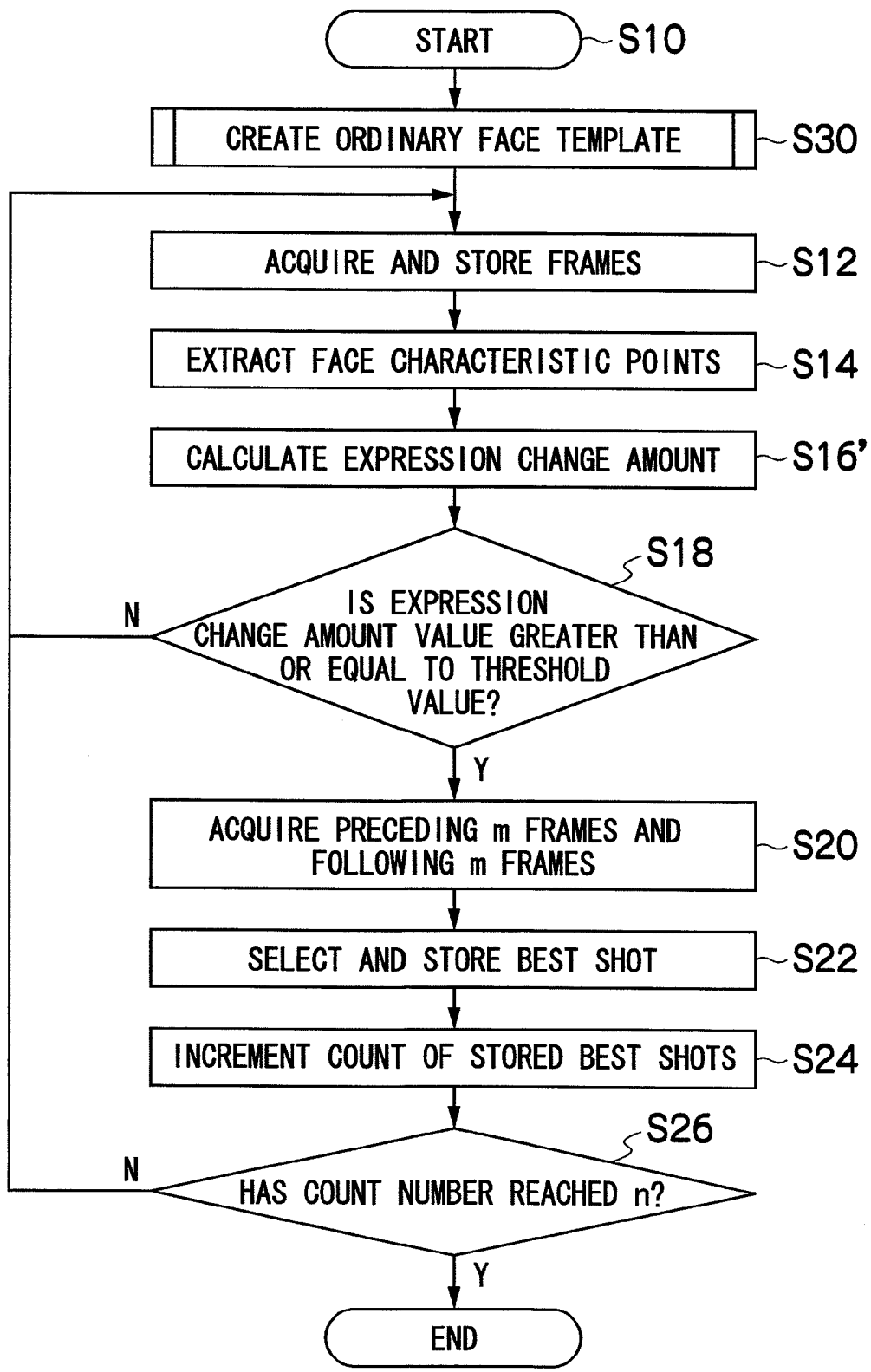
FIG. 6 is a flowchart showing an overall flow of processing of a second embodiment according to the present invention.

FIG. 6 is a flowchart showing an overall flow of processing of a second embodiment according to the present invention. Note that the sections of the method in common with the first embodiment shown in FIG. 3 are assigned the same step numbers, and detailed descriptions of these sections are omitted.

In the first embodiment shown in FIG. 3, the expression change amount of the face in frames preceding and following the target frame was calculated. The second embodiment shown in FIG. 6 differs in that expression change amounts of the face in the continuously captured target frames relative to a face of an ordinary face template (reference template) are calculated.

When capturing/storing of the n best shot images (where "n" has been set in advance) is started by first image capture instruction (step S10), the ordinary face template is created (step S30).

Figure 7:
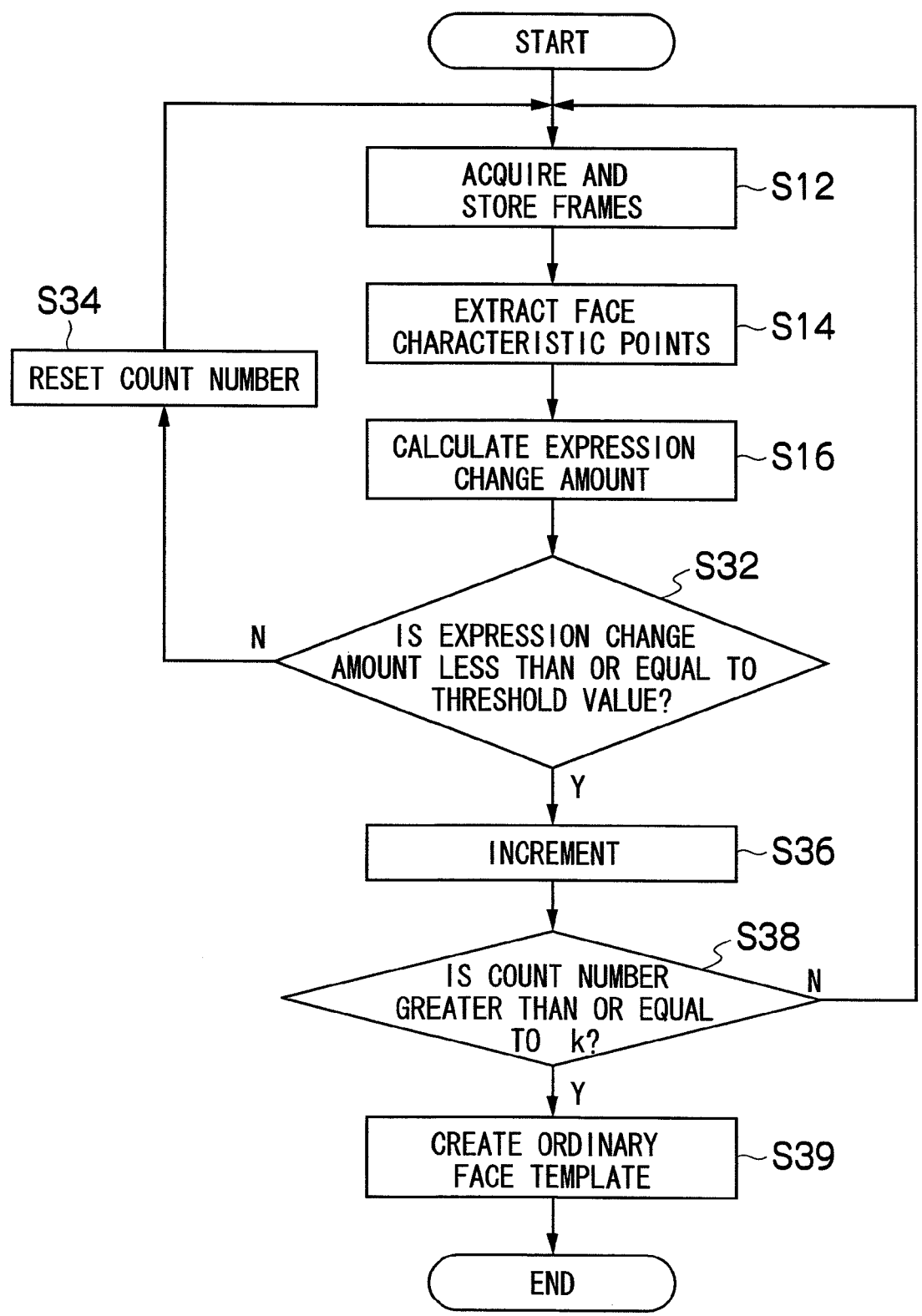
FIG. 7 is a flowchart showing a processing procedure for creating an ordinary face template.

FIG. 7 is a flowchart showing a processing procedure for creating the ordinary face template. Note that the sections of the procedure in common with the first embodiment shown in FIG. 3 are assigned the same step numbers, and detailed descriptions of these sections are omitted.

In the flowchart for the creation of the ordinary face template, a predetermined number "k" of frame images including faces having smaller expression change amounts is extracted, and the ordinary face template is created from average values for the characteristic points of the face parts of the extracted frame images.

As shown in FIG. 7, when the processing to create the ordinary face template has begun, the processing judges whether the expression change amount calculated based on the characteristic points of the face extracted from the preceding and current frame images is less than or equal to a predetermined threshold value (step S32). When the expression change amount is greater than the threshold value, the processing resets the count number of a counter which counts to the predetermined number k, clears the frame images temporarily stored in the SDRAM 24 (step S34), and returns to step S12. Note that the predetermined number k may, for instance, be found by dividing, by the frame period, a predetermined period over which an unchanging facial expression must continue to be designated as the ordinary face.

When judging in step S32 that the expression change amount is less than or equal to the predetermined threshold value, the processing increments the count of the counter by one (step S36), and then judges whether the current count is greater than or equal to the predetermined number k. When the current count is less than the predetermined number k, the processing returns to step S12. When the current count is greater than or equal to the predetermined number k, the processing moves to step S39.

In step S39, the processing calculates average values for the characteristic points of the face parts in the predetermined number k of frame images (that is, k frame images) stored in the SDRAM 24, and sets the position coordinates for the average characteristic points as the ordinary face template.

As shown FIG. 6, after completing the creation of the ordinary face template in the manner described above, the processing begins the image capture/storing of actual best shot images.

In step S16 of the first embodiment (FIG. 2), the processing calculated the expression change amounts in preceding and following frames. In the step S16' of the second embodiment, however, the processing calculates the expression change amount between the face characteristic points $P_i(x_i, y_i)$ extracted from the inputted target frames and the characteristic points of the ordinary face template. Note that when calculating the expression change amount in step S16', it is preferable that both sets of characteristic points are normalized in advance.

With this arrangement, it is possible to calculate the expression change amounts in a face with respect to an ordinary face. A single best image (best shot image) is then selected from among the 2m+1 frame images (best image candidates) extracted based on the target frame for which the expression change amount is largest, and stored in the storage medium 16. The best shot image selection and the like is performed in a similar manner to the first embodiment.

Modifications to the Second Embodiment

In the above-described second embodiment, the ordinary face template was created before beginning to capture and record the actual best shot images. However, the ordinary face template may be created in advance and stored in the EEPROM 32. When creating the ordinary face template in advance, an expressionless face database may be used in the creation process.

Alternatively, ordinary face templates may be recorded for each human subject to be captured, and the ordinary face template for the subject of a given shot may be read off before beginning to capture the best shot image.

Another possibility is that an average ordinary face template is created from an ordinary face of multiple subjects and stored on the EEPROM 32.

A further possibility is that ordinary face templates based on various subject attributes is created and stored in the EEPROM 32. Characteristics which may be considered for use as the subject attributes include sex, age, maturity (child or adult) and race.

Note that the ordinary face templates need not be created using the digital camera 10, and may be stored in the EEPROM 32 before shipping, or stored based on input from an external source.

Third Embodiment

Figure 8:
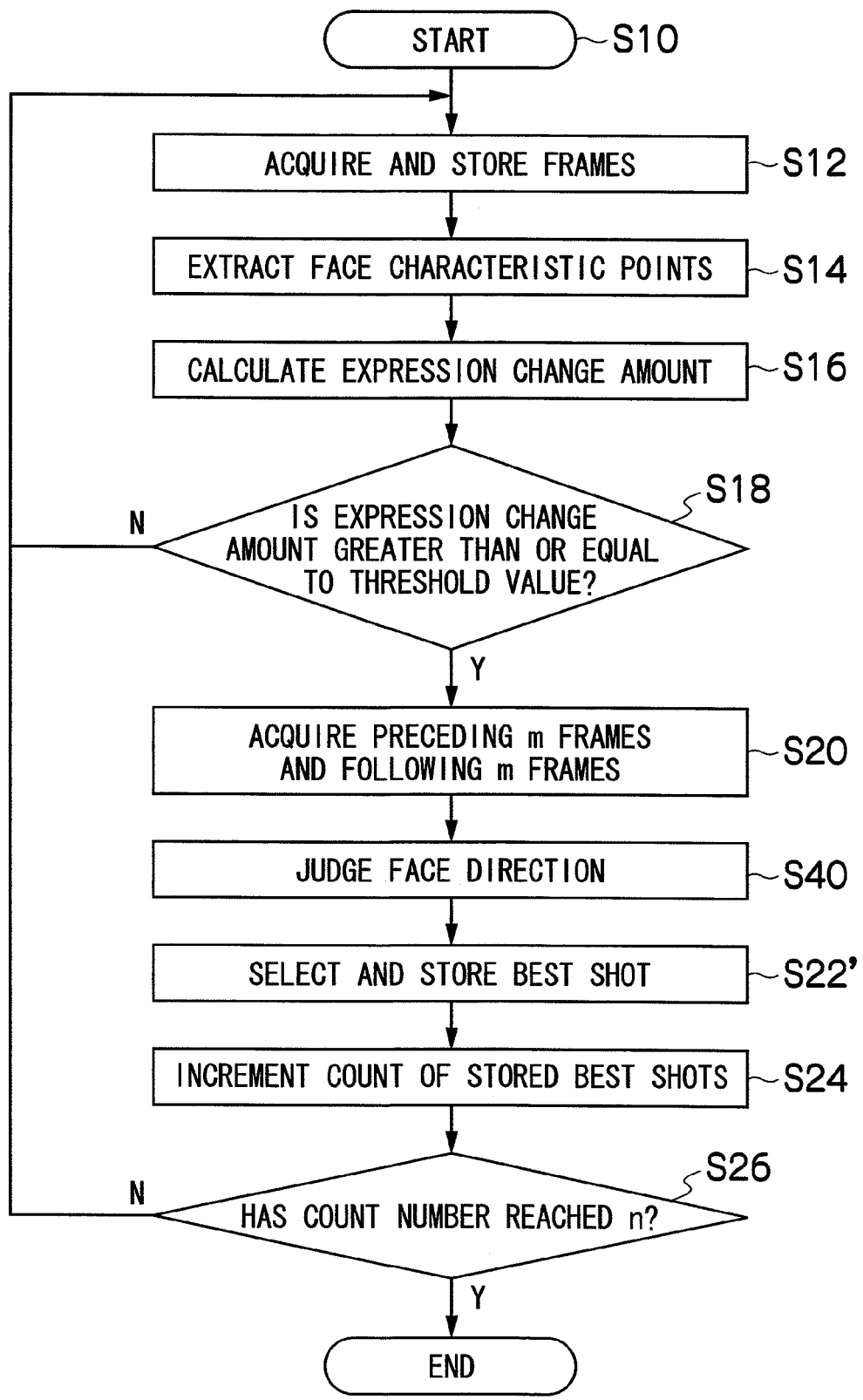
FIG. 8 is a flowchart showing an overall flow of processing of a third embodiment according to the present invention.

FIG. 8 is a flowchart showing an overall flow of processing of a third embodiment according to the present invention. Note that the sections of the procedure shared with the first embodiment shown in FIG. 3 are assigned the same step numbers, and detailed descriptions of these sections are omitted.

In the third embodiment shown in FIG. 8, the processing of the first embodiment is supplemented with processing of step S40. Also, Step S22' provides a different processing procedure to the best shot image selection method of step S22.

In step S40, the processing judges a face direction (direction of a face) in each best image candidate.

[Calculating Face Direction Scores]

Figure 9:
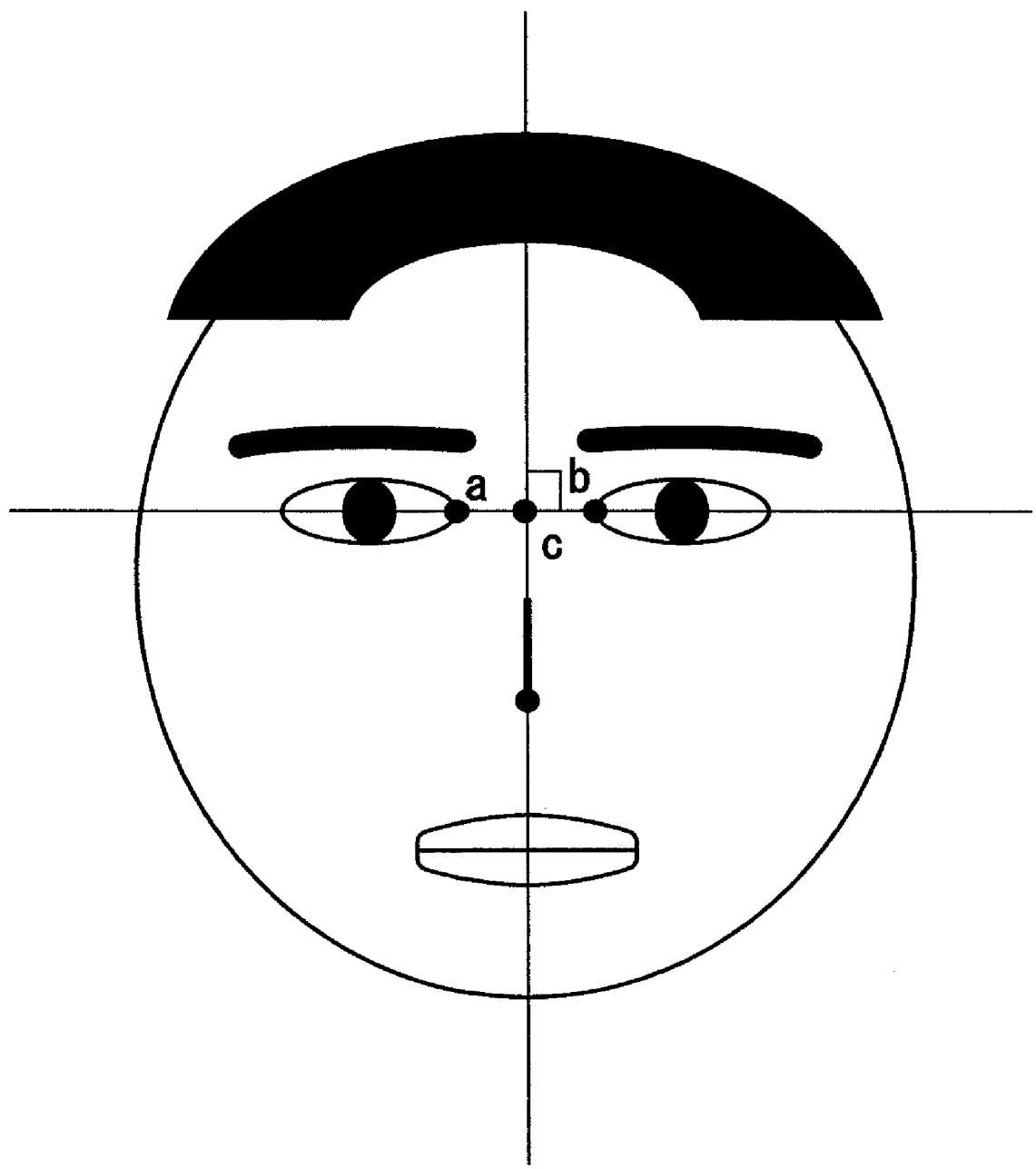
FIG. 9 is a diagram for describing method for detecting a direction of a face (face direction)

As shown in FIG. 9, the inward end point of the right eye is denoted "a" and the inward end point of the left eye is denoted "b". An intersection between a line ab and a line that extends parallel to the ridge of the nose and perpendicular to the line ab is denoted c.

Scoring is performed by comparing a distance ac with a distance bc.

The processing calculates scores (face direction score) based on ratios between the distances or based on differences in the distances. When the distance ac and the distance bc are closer in value to each other (approach equivalence), it is judged that the face is closer to a frontal face (the face almost faces the front) and the face is awarded higher score. When only able to extract one eye, the processing judges that the face is in profile and awards a score of "0".

In addition, the processing may use a dictionary of faces including a front-facing face corresponding to 0°, a profile face corresponding to 90° and faces between these two at intervals of 10°, judge whether a degree of matching between the face in each frame and the faces in the angle dictionary is high, and awarding scores depending on the degree of matching.

Returning to FIG. 8, it can be seen that in step S22' the processing selects a single best image (best shot image) from the 2m+1 frame images (best image candidates) extracted in step S20. In the first embodiment shown in FIG. 3, the best shot image was selected based on the smile-likeness score alone or the smile-likeness score together with the expression change amount. In step S22', however, the processing awards a score that is the sum of the smile-likeness score and the face direction score to each best image candidate, and selects the best image candidate with the highest resulting score as the best shot image.

Alternatively, the processing may select the best shot image from among best image candidates having a resulting score that is greater than or equal to a predetermined value.

In step S22', the processing then stores the selected best shot image in the storage medium 16 as described above.

Modifications to the Third Embodiment

In the above-described third embodiment, the face direction score was used to select the best shot image. However, instead of the face direction score or in addition to the face direction score, a direction of a subject's eyes may be judged. In this case, when the subject's eyes are casted on the camera more straightforward, the score becomes higher in the scoring, and the score (subject's eyes' direction score) may be used to select the best shot image.

To judge the direction of the subject's eyes, the processing detects positions of the pupils in the eye regions. For example, when the face is facing forwards and the pupil positions are centrally positioned in the eye regions, it is judged that the subject's eyes are casted on the camera. Thus, the processing is able to judge the direction of the subject's eyes based on the face direction and the positions of the pupils in the eye regions.

Any one of the smile-likeness score, the face direction score, the subject's eyes' direction score and the expression change amount may be used to select the best shot image from among the best image candidates. Alternatively, two or more of the scores may be suitably combined and used in the selection.

Besides the smiling face template, other facial expression templates may be prepared. The processing may then select the expression template closest to the best image candidates and award a score to each best candidate image based on the degree of resemblance to the facial expression of the selected expression template.

Fourth Embodiment

Figure 10:
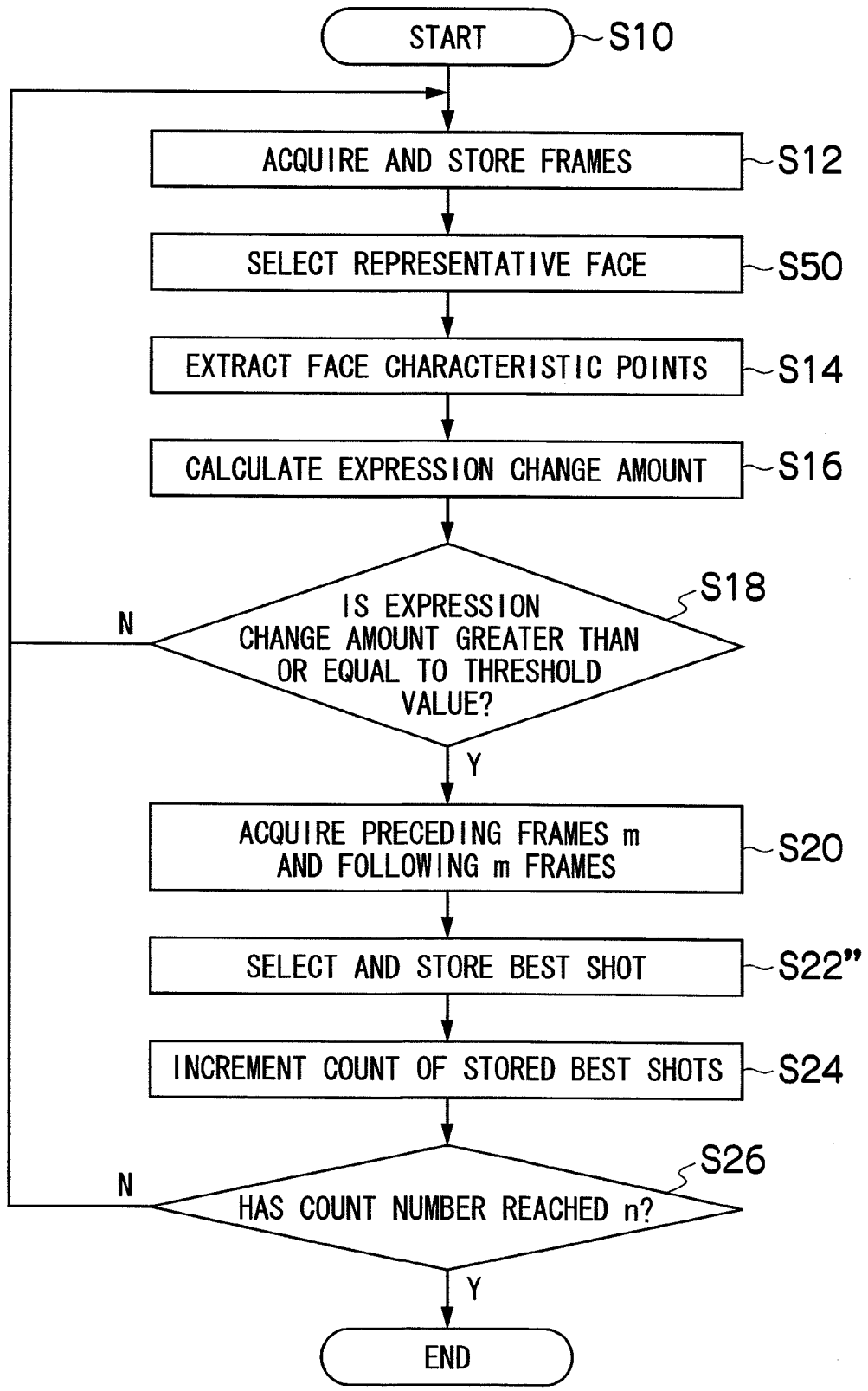
FIG. 10 is a flowchart showing an overall flow of processing for a fourth embodiment according to the present invention.

FIG. 10 is a flowchart showing an overall flow of processing of a fourth embodiment according to the present invention. Note that the sections of the procedure in common with the first embodiment shown in FIG. 3 are assigned the same step numbers, and detailed descriptions of these sections are omitted.

In the fourth embodiment shown in FIG. 10, the processing of the first embodiment is supplemented with processing of step S50. Also, step S22" provides a different processing procedure to the best shot image selection method of step S22.

When detecting, in step S50, a plurality of faces in the frame image, the processing selects a representative face. The processing may select the largest face among the plurality of faces detected by the face detecting unit 30 as the representative face. Alternatively, the processing may award each face region points for determining importance in each of the conditions which are one or more selected from among face brightness, position, size and face clarity, and use the face having the largest total sum of the points as the representative face.

The processing of steps S14 to S18 is only performed on the representative face selected in step S50.

In step S22", the processing selects a single best image (best shot image) from among the 2m+1 frame images (best image candidates) extracted in step S20 using one of the following.

(1) The processing may pick out the frame containing the largest number of faces with a smile-likeness score of at least a threshold value as the best shot image. When a plurality of frames has the same number of smiling faces, the processing picks out the frame in which the representative face has the highest smile-likeness score as the best shot image.

(2) The processing may pick out the frame containing the largest number of faces with a smile-likeness score of at least the threshold value as the best shot image. When a plurality of frames has the same number of smiling faces, the processing picks out the frame in which the representative face has largest expression change amount as the best shot image.

In the above-described (1) and (2), it is necessary to calculate the smile-likeness score for faces other than the representative face, in addition to the respective face.

(3) The processing picks out the frame in which the representative face has the highest smile-likeness score as the best shot image.

(4) The processing picks out the frames in which the representative face has a smile-likeness score of at least a threshold value, and from among these frames, picks out the frame having the largest expression change amount in the representative face as the best shot image.

In the above-described (3) and (4), there is no need to calculate the smile-likeness score for faces other than the representative face, and the processing resembles that of step S22 of the first embodiment.

Note that the best shot image may be selected after taking into account the face direction score and the subject's eyes' direction score in the manner described in the third embodiment and the modification example of the third embodiment.

Fifth Embodiment

The following describes a user interface when capturing images in the best shot image capture mode.

Since the storage timing for the best shot image in the best shot image capture mode is determined on the camera-side, the user is informed that the image has been stored using a sound or display indicator.

Figure 11:
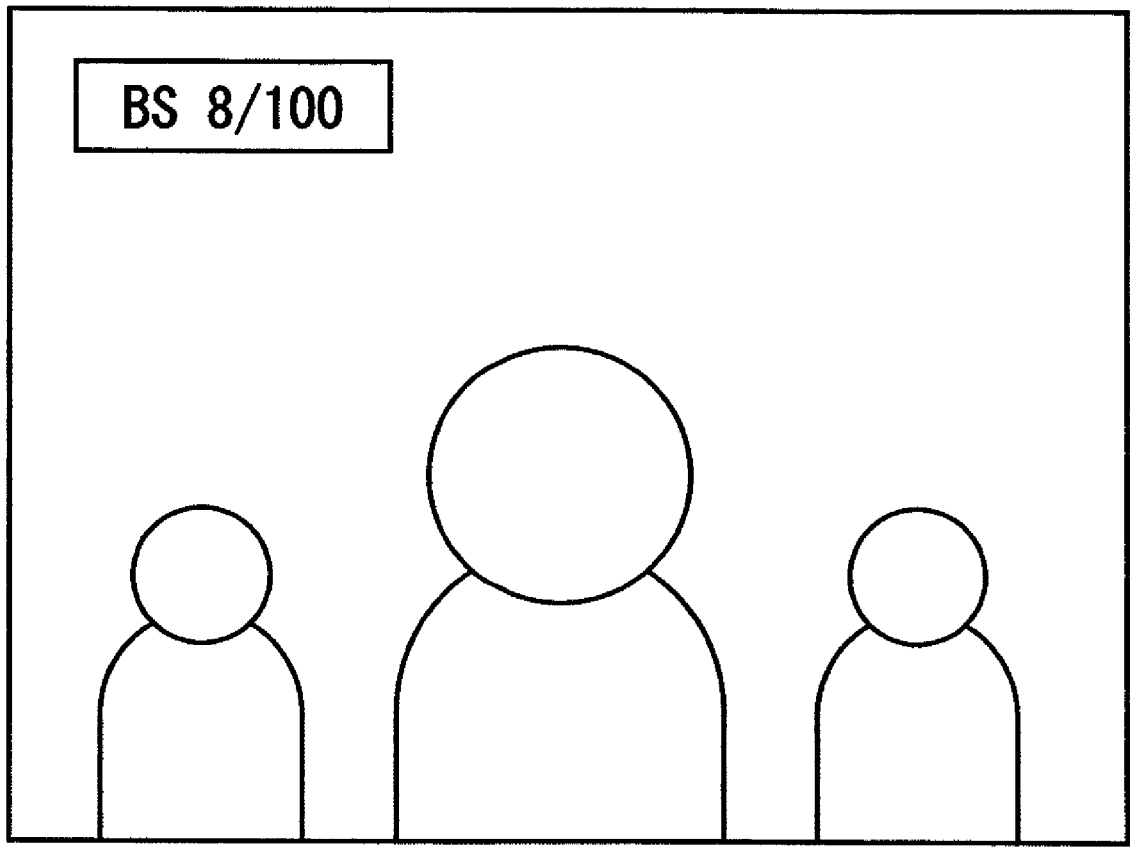
FIG. 11 is a diagram showing a first example of a screen displayed on a display unit when capturing images in a best shot image capture mode.

FIG. 11 shows an example of a screen displayed on the display unit 14 during image capture in the best shot image capture mode. As well as displaying the pass-through image, the display unit 14 displays a maximum number of storable best shots (BS) (100) and a current number of stored best shots (8).

This arrangement allows the user to see how many best shot images can still be stored. Moreover, counting up the current number of stored best shots when a new best shot is taken allows the user to see the timing when the best shots are stored.

Figure 12B:
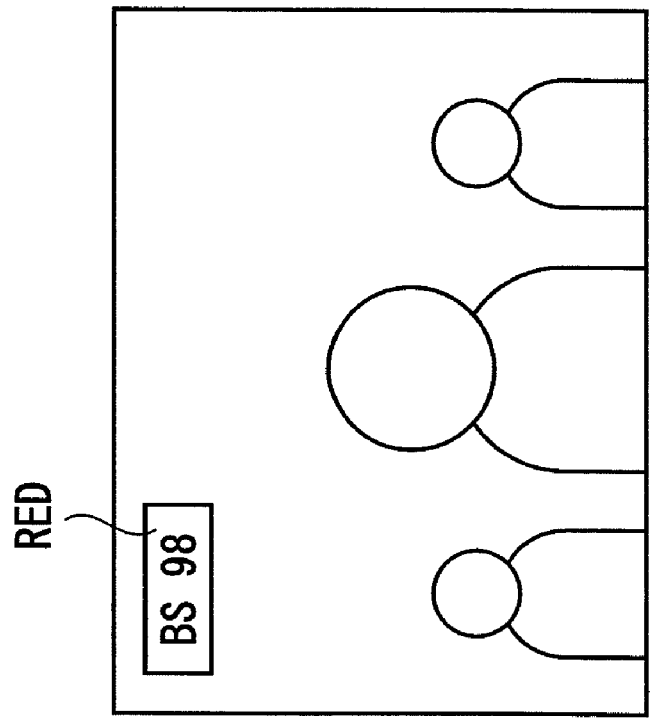
FIGS. 12A and 12B are diagrams showing a second example of screens displayed on the display unit when capturing images in the best shot image capture mode.
Figure 12A:
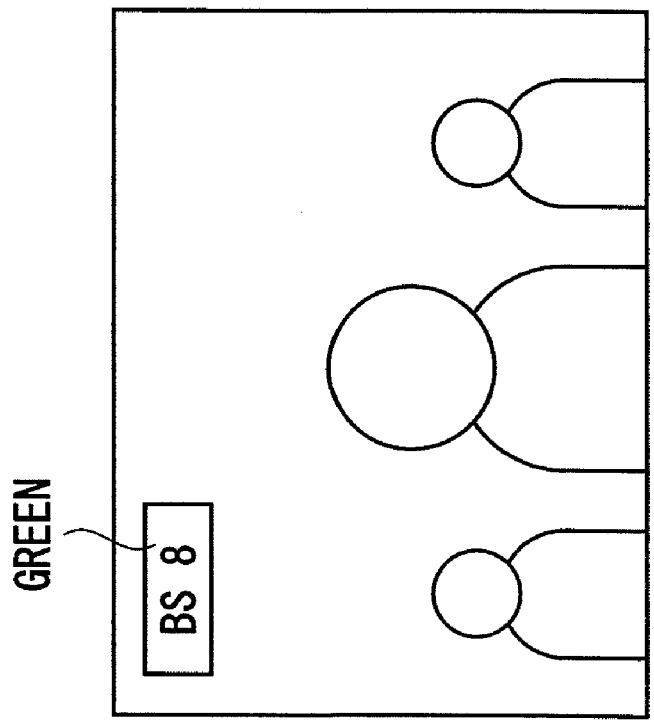

FIGS. 12A and 12B show a second example of screens displayed on the display unit 14 during image capture in the best shot image capture mode.

The display screens of the display unit 14 shown in FIGS. 12A and 12B display the current number of best shots together with the pass-through image. Further, the color of the indicator is changed according to the current number of stored best shots.

Specifically, the indicator varies gradually in color, being green when the current number of stored best shots is a small proportion of the maximum number of best shots (BS), yellow when the current number is approximately half of the maximum number and red when the current number nears the maximum number.

Since, in the example shown in FIG. 12A, it supposed that the maximum number of the best shots (BS) is "100", the numeral "8" is displayed in green when eight best shots have been stored (see FIG. 12A) and the numerals "98" are displayed in red when ninety-eight best shots have been stored (see FIG. 12B).

Note that the present invention is not limited to altering the color of the indicator for the stored number of best shots according to the proportion of the maximum number of best shots constituted by the current number of stored best shots. The indicator may only be caused to change color when the current number of stored best shots approaches the maximum number. Further, the present invention is not limited to altering the color of the indicator. For instance, the current number of stored best shots may blink on and off. Any indicator is acceptable provided that there is a change in the way the current number of stored best shots is displayed as the current number approaches the maximum number.

Figure 13B:
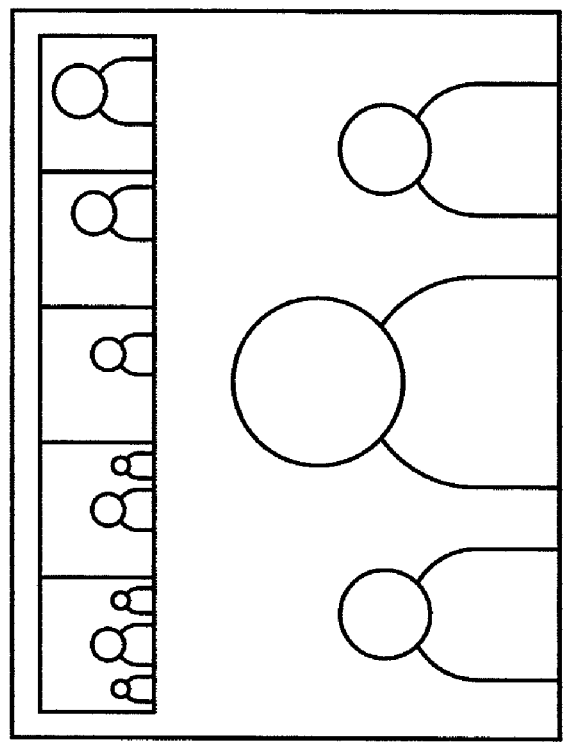
FIGS. 13A and 13B are diagrams showing a third example of screens displayed on the display unit when capturing images in the best shot image capture mode.
Figure 13A:
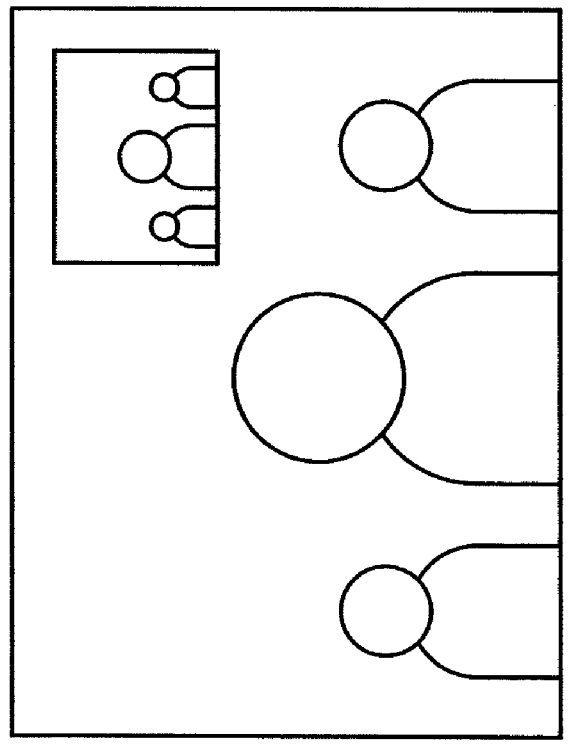

FIGS. 13A and 13B show a third example of screens displayed on the display unit 14 during image capture in the best shot image capture mode.

The display screen of the display unit 14 shown in FIG. 13A displays reduced-size images of the latest best shot stored in the storage medium 16 in a small window together with the pass-through image.

The display screen of display unit 14 shown in FIG. 13B displays reduced-size images of the five latest best shots stored in the storage medium 16 in a small window with the pass-through image. When a new best shot image is recorded, the reduced-size best shot images displayed on the display screen of the display unit 14 are updated.

Note that the number of reduced-size best shot images displayed on the display screen of the display unit 14 is not limited to the numbers of the present embodiment.

Every time a best shot image is stored, a sound (an ear-catching sound such as the click of a shutter) is generated by the audio controlling unit 38 via the speaker 39 to indicate the moment that the best shot image is stored.

The number of stored best shot images, the display of stored images and the ear-catching sound at the moment of storage may be combined to enable an improvement in usability.

Modification Examples

Although, in the embodiments, the digital camera 10 was used as an example, the present invention is applicable to monitoring cameras and cameras in mobile telephones. It is also possible to prepare an image processing program for causing a personal computer or the like to function as the image processing device according to the embodiments, install the image processing program on the computer and cause the computer to execute the program. When installing the program on a computer, a recording medium on which the program is recorded may be used.

For instance, it is possible to use images continuously shot such as moving images captured as video, TV images or the like as inputted images, extract the best shot image from the inputted images, and store the best shot as a still image.

Further, the present invention may also be a suitable combination of the above-described embodiments.

Note also that although details of the image processing apparatus, the image capturing apparatus, the image processing method, the image processing program and the recording medium according to the present invention have been described, the present invention is not limited to these examples and may be improved and modified in various ways without departing from the scope or spirit of the invention.

What is claimed is:

1. An image processing apparatus comprising:
    an image acquiring device configured to sequentially acquire images that are captured in a continuous manner;
    a face detecting device configured to detect a face in the acquired images;
    an expression change amount calculating device configured to calculate an expression change amount representing a change in expression between a face detected in an image of a current target frame in the acquired images and a face detected in an image of a previous target frame, for each of the target frames, the target frames being every acquired frame or frames at a regular interval in the acquired frames;
    an extracting device configured to extract an image of a target frame for which the calculated expression change amount is greater than or equal to a predetermined value;
    a best image candidate extracting device configured to extract, as best image candidates, a plurality of groups of images, each of the groups including the image of the extracted target frame and images of a plurality of consecutive frames which are at least one of preceding and following the image of the target frame, from the sequentially acquired images;
    a best image selecting device configured to select a best image from each of the groups; and
    a storage device configured to store in a storage medium the image of the extracted target frame or an image of a frame near the extracted target frame, the storage device storing the selected best image in the storage medium.

2. An image processing apparatus comprising:
    an image acquiring device configured to sequentially acquire images that are captured in a continuous manner;
    a face detecting device configured to detect a face in the acquired images;

an expression change amount calculating device which configured to calculate an expression change amount representing a changes in expression between a face detected in an image of each target frame and a reference template face, for each of the target frames, the target frames being every acquired frame or frames at a regular interval in the acquired frames;

an extracting device which configured to extract an image of a target frame for which the calculated expression change amount is greater than or equal to a predetermined value;

a best image candidate extracting device configured to extract, as best image candidates, a plurality of groups of images, each of the groups including the image of the extracted target frame and images of a plurality of consecutive frames which are at least one of preceding and following the image of the target frame, from the sequentially acquired images;

a best image selecting device configured to select a best image from each of the groups; and a storage device which configured to store in a storage medium the image of the extracted target frame or an image of a frame near the extracted target frame, the storage device storing the selected best image in the storage medium.

3. The image processing apparatus according to claim 2, wherein
the reference template is created based on coordinate positions of a plurality of characteristic points corresponding to face parts of an ordinary face of one or more persons.

4. The image processing apparatus according to claim 3, wherein
a plurality of the reference templates corresponding to human attributes are created in advance and stored in a memory, and
a reference template corresponding to a human attribute in the images acquired by the image acquiring device is read from the memory and used.

5. The image processing apparatus according to claim 1, further comprising:
a representative face selecting device configured to select, when a plurality of faces are detected by the face detecting device, a representative face according to a condition on at least one of brightness, position, size, and clearness of a face, as a detected face in the image of the target frame.

6. The image processing apparatus according to claim 1, wherein
the expression change amount detecting device includes: a characteristic point extracting device which extracts a plurality of characteristic points corresponding to each of the face parts;
a normalizing device configured to normalize coordinate positions of the extracted characteristic points; and
a calculating device configured to calculate, for two compared faces, the expression change amount based on a sum of distances between the normalized coordinate positions of corresponding characteristic points in each face, or a sum of squares of the distances therebetween.

7. The image processing apparatus according to claim 1, wherein
the best image selecting device includes:
at least one of:
a first evaluating device configured to compare the faces of the best image candidates with an expression template representing a predetermined expression and awards a score to each best image candidate based on results of the comparison;
a second evaluation device configured to detect a face direction in the best image candidates and awards a score to each best image candidate based on the detected face direction; and
a third evaluating device configured to detect a direction of a subject's eyes in the best image candidates and awards a score to each best image candidate based on the detected direction of the subject's eyes; and
a selecting device configured to select the best image from among the best image candidates based on the one or more scores awarded by the at least one of the evaluation devices.

8. The image processing apparatus according to claim 7, wherein
the selecting device selects the image having a highest score as the best image, or selects, from among best image candidates whose score is greater than or equal to a predetermined value, an image having a largest expression change amount calculated by the expression change amount calculating device as the best image.

9. An image capturing apparatus, comprising:
an image capturing device operable to capture images of a subject in a continuous manner; and
the image processing apparatus according to claim 1, wherein
the image acquiring device sequentially acquires the images captured in a continuous manner by the image capturing device.

10. The image capturing apparatus according to claim 9, further comprising:
an image capture instructing device; and
a stored number setting device configured to set a number of images to be stored in the storage medium in response to a single image capture instruction by the image capture instructing device, wherein
when the instruction for image capture is issued by the image capture instructing device, an image capturing operation by the image capturing device and image processing by the image processing apparatus are repeated until a number of stored images reaches the set number of images to be stored.

11. The image capturing apparatus according to claim 10, further comprising
a capture termination instructing device, wherein
when, after the image capture instructing device has issued the instruction for image capture, an instruction for capture termination is issued by the capture termination instructing device, the image capturing operation by the image capturing device and image processing by the image processing apparatus are terminated before the number of the stored images reaches the set number of images to be stored.

12. The image capturing apparatus according to claim 9, further comprising
an image capture instructing device, wherein
when the instruction for image capture is issued by the image capture instructing device, an image capturing operation by the image capturing device and image processing by the image processing apparatus are repeated until no space remains in the storage medium.

13. The image capturing apparatus according to claim 12, further comprising
a capture termination instructing device, wherein when, after the image capture instructing device has issued the instruction for image capture, an instruction for capture termination is issued by the capture termination instructing device, the image capturing operation by the image capturing device and image processing by the image processing apparatus are terminated before no space remains in the storage medium.

14. The image capturing apparatus according to claim 9, further comprising
a sound generating device configured to generate a sound every time an image is stored in the storage medium to alert a user of a storage timing.

15. The image capturing apparatus according to claim 9, further comprising:
an image displaying device configured to display images captured in a continuous manner by the image capturing device; and
a display controlling device configured to cause the image displaying device to display one or more images most recently stored on the storage medium as reduced-size images having an area smaller than a whole display area of the image displaying device.

16. The image capturing apparatus according to claim 9, further comprising
a displaying device configured to display a maximum number of images storable on the storage medium and a current number of stored images, the current number of stored images being updated every time an image is stored in the storage medium.

17. The image capturing apparatus according to claim 9, further comprising
a displaying device configured to display the current number of stored images that is updated every time an image is stored in the storage medium and to change a display form of the current number of stored images at least when the number of image stored on the storage medium approaches a maximum number of images storable in the storage medium.

18. An image processing method comprising steps of:
sequentially acquiring images captured in a continuous manner;
detecting a face in the acquired images;
calculating an expression change amount representing a change in expression between a face detected in an image of a current target frame in the acquired images and a face detected in an image of a previous target frame, for each of the target frames, the target frames being every acquired frame or frames at a regular interval in the acquired frames;
extracting an image of a target frame for which the calculated expression change amount is greater than or equal to a predetermined value;
extracting, as best image candidates, a plurality of groups of images, each of the groups including the image of the extracted target frame and images of a plurality of consecutive frames which are at least one of preceding and following the image of the target frame, from the sequentially acquired images;
selecting a best image from each of the groups; and
storing in a storage medium the image of the extracted target frame or an image of a frame near the extracted target frame, and storing the selected best image in the storage medium.

19. An image processing method comprising steps of:
sequentially acquiring images captured in a continuous manner;
detecting a face in the acquired images;
calculating an expression change amount representing a changes in expression between the face detected in image of each target frame and a reference template face, for each of the target frames, the target frames being every acquired frame or frames at a regular interval in the acquired frames;
extracting an image of a target frame for which the calculated expression change amount is greater than or equal to a predetermined value; and
extracting, as best image candidates, a plurality of groups of images, each of the groups including the image of the extracted target frame and images of a plurality of consecutive frames which are at least one of preceding and following the image of the target frame, from the sequentially acquired images;
selecting a best image from each of the groups; and
storing in a storage medium in a storage medium the image of the extracted target frame or an image of a frame near the extracted target frame, and storing the selected best image in the storage medium.

20. A non-transitory recording medium on which an image processing program is stored, the image processing program causing a computer to realize functions of:
sequentially acquiring images captured in a continuous manner;
detecting a face in the acquired images;
calculating an expression change amount representing a change in expression between a face detected in an image of a current target frame in the acquired images and a face detected in an image of a previous target frame, for each of the target frames, the target frames being every acquired frame or frames at a regular interval in the acquired frames;
extracting an image of a target frame for which the calculated expression change amount is greater than or equal to a predetermined value;
extracting, as best image candidates, a plurality of groups of images, each of the groups including the image of the extracted target frame and images of a plurality of consecutive frames which are at least one of preceding and following the image of the target frame, from the sequentially acquired images;
selecting a best image from each of the groups; and
storing in a storage medium the image of the extracted target frame or an image of a frame near the extracted target frame, and storing the selected best image in the storage medium.

21. A non-transitory recording medium on which an image processing program is stored, the image processing program causing a computer to realize functions of:
sequentially acquiring images captured in a continuous manner;
detecting a face in the acquired images;
calculating an expression change amount representing a changes in expression between the face detected in image of each target frame and a reference template face, for each of the target frames, the target frames being every acquired frame or frames at a regular interval in the acquired frames;
extracting an image of a target frame for which the calculated expression change amount is greater than or equal to a predetermined value; and
extracting, as best image candidates, a plurality of groups of images, each of the groups including the image of the extracted target frame and images of a plurality of consecutive frames which are at least one of preceding and following the image of the target frame, from the sequentially acquired images;

selecting a best image from each of the groups; and storing in a storage medium in a storage medium the image of the extracted target frame or an image of a frame near the extracted target frame, and storing the selected best image in the storage medium.

22. The image processing apparatus according to claim 1, wherein the best image selecting device calculates a score for each image in the groups by comparing the each image with an expression template representing a predetermined expression which is different from an expression represented by the reference image, and selects a best image from each image in the groups based on the calculated score.

23. The image processing apparatus according to claim 1, wherein the best image selecting device calculates a score for each image in the groups by comparing a characteristic amount of the each image with a characteristic amount of an ordinary face and selects a best image from each image in the groups based on the calculated score, and the characteristic amount includes at least one of a position of a characteristic point in the face, a distance between characteristic points in the face and a line in the face.

24. The image processing apparatus according to claim 23, wherein the best image selecting device calculates the score by awarding a weighted point for each characteristic amount.

25. The image processing apparatus according to claim 2, wherein a plurality of reference template faces for each human subject to be captured, or corresponding to various subject attributes are included.

* * * * *